United States Patent
Harjunen et al.

(10) Patent No.: US 6,658,090 B1
(45) Date of Patent: Dec. 2, 2003

(54) METHOD AND SYSTEM FOR SOFTWARE UPDATING

(75) Inventors: Timo Harjunen, Helsinki (FI); Esa Hintsala, Helsinki (FI); Petri Jäppilä, Helsinki (FI); Reijo Koivula, Espoo (FI); Tapio Pehkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 19 days.

(21) Appl. No.: 10/120,484

(22) Filed: Apr. 12, 2002

Related U.S. Application Data

(63) Continuation of application No. PCT/FI00/00878, filed on Oct. 12, 2000.

(30) Foreign Application Priority Data

Oct. 14, 1999 (FI) .............................................. 19992221

(51) Int. Cl.⁷ .......................... H04M 1/24; H04M 3/08; H04M 3/22
(52) U.S. Cl. ..................... 379/9.01; 379/29.08; 714/38; 714/703; 717/168; 717/173
(58) Field of Search ................ 379/9.01, 9.05, 379/10.01, 10.03, 15.01, 15.03, 29.08, 242; 714/38, 703, 712, 715; 717/168, 172, 173, 177, 178

(56) References Cited

U.S. PATENT DOCUMENTS

| | | | |
|---|---|---|---|
| 5,327,418 A | * 7/1994 | Schlag et al. | 370/220 |
| 5,410,703 A | 4/1995 | Nilsson et al. | 395/700 |
| 5,421,017 A | * 5/1995 | Scholz et al. | 717/170 |
| 5,555,418 A | * 9/1996 | Nilsson et al. | 717/153 |
| 5,682,533 A | 10/1997 | Siljestroemer | 395/616 |
| 5,734,695 A | * 3/1998 | Seesing et al. | 379/9 |
| 5,787,147 A | * 7/1998 | Gundersen | 379/10.03 |
| 5,978,940 A | 11/1999 | Newman et al. | 714/712 |
| 6,556,660 B1 | * 4/2003 | Li et al. | 379/15.01 |

FOREIGN PATENT DOCUMENTS

| | | | |
|---|---|---|---|
| GB | 2 315 637 | 2/1998 | H04Q/3/00 |
| WO | 99/27733 | 6/1999 | H04Q/7/34 |

* cited by examiner

Primary Examiner—Binh Tieu
(74) Attorney, Agent, or Firm—Antonelli, Terry, Stout & Kraus, LLP

(57) ABSTRACT

A method and system for updating software in a network element of a telecommunication network the units of which are divided into an original side and testing side. The system includes a network element, having units that are logically divided into an original side and testing side, an original software for performing traffic transmitting tasks, and a new piece of software to be tested and/or introduced. At least one test connections is directed into the units of testing side loaded with the new piece of software, in order to be able to test the new piece of software.

27 Claims, 8 Drawing Sheets

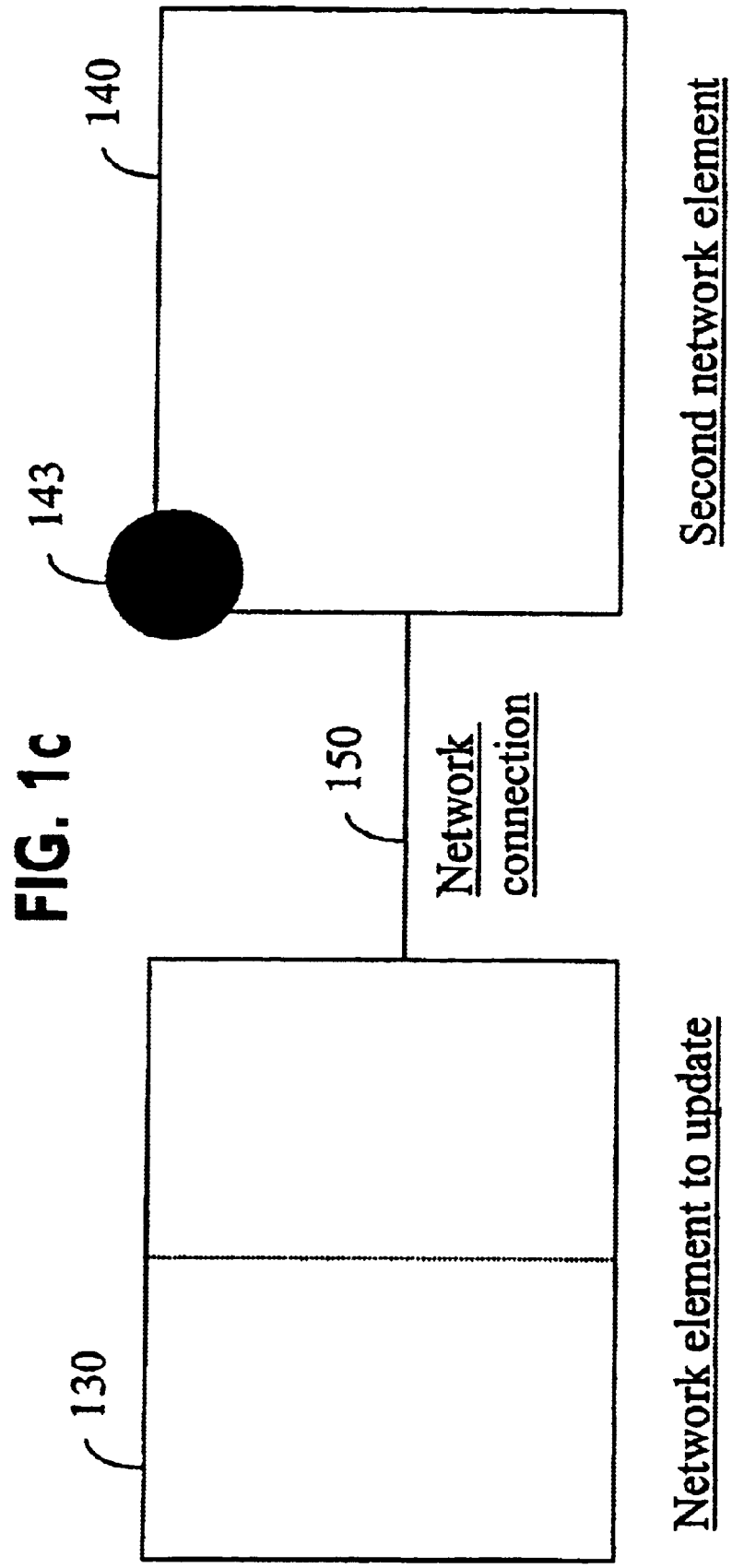

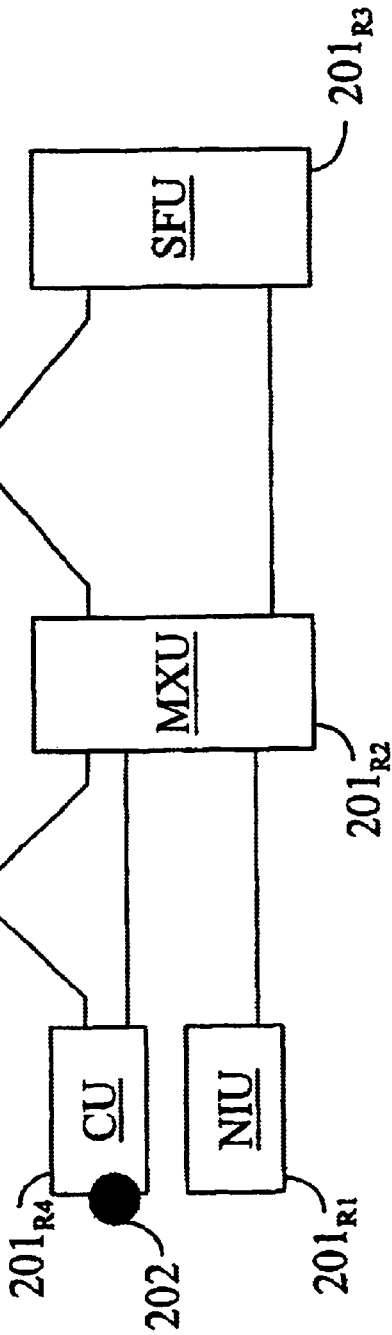

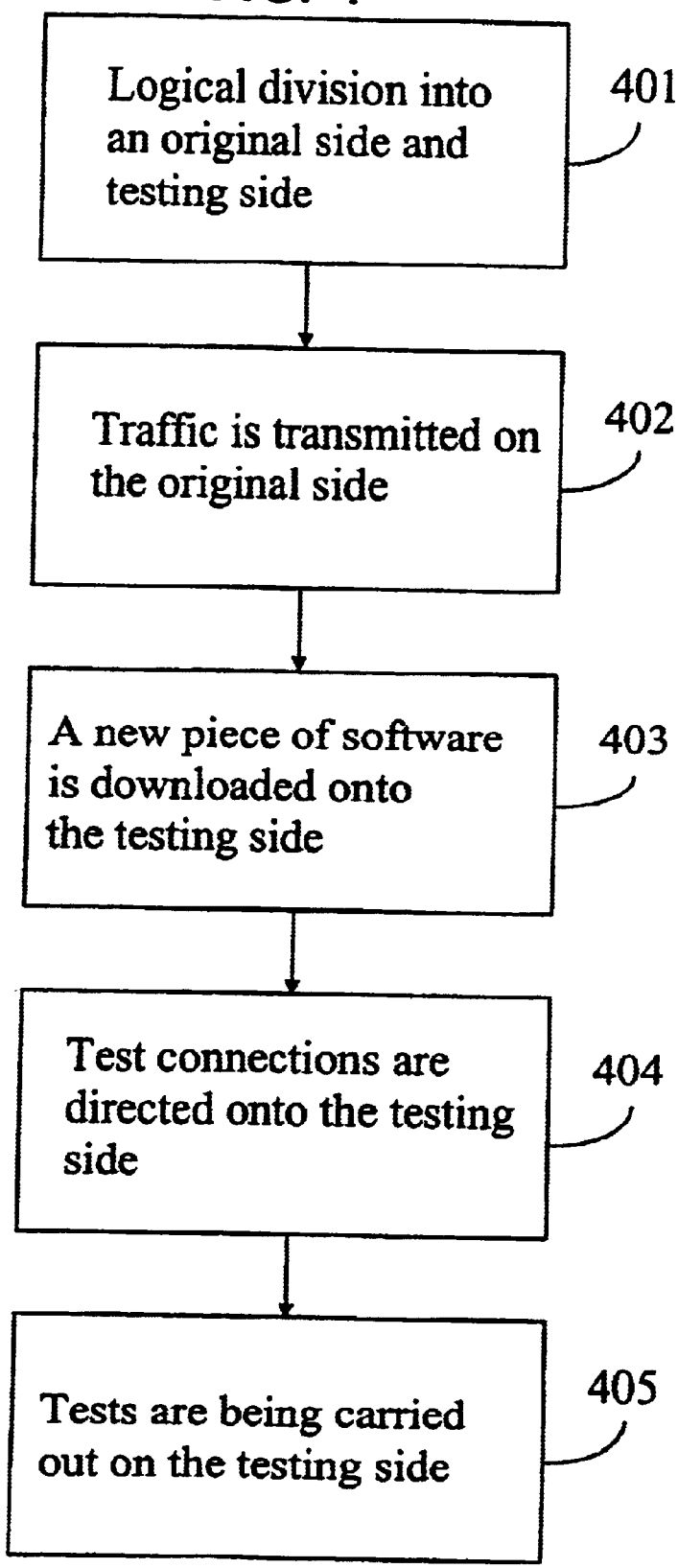

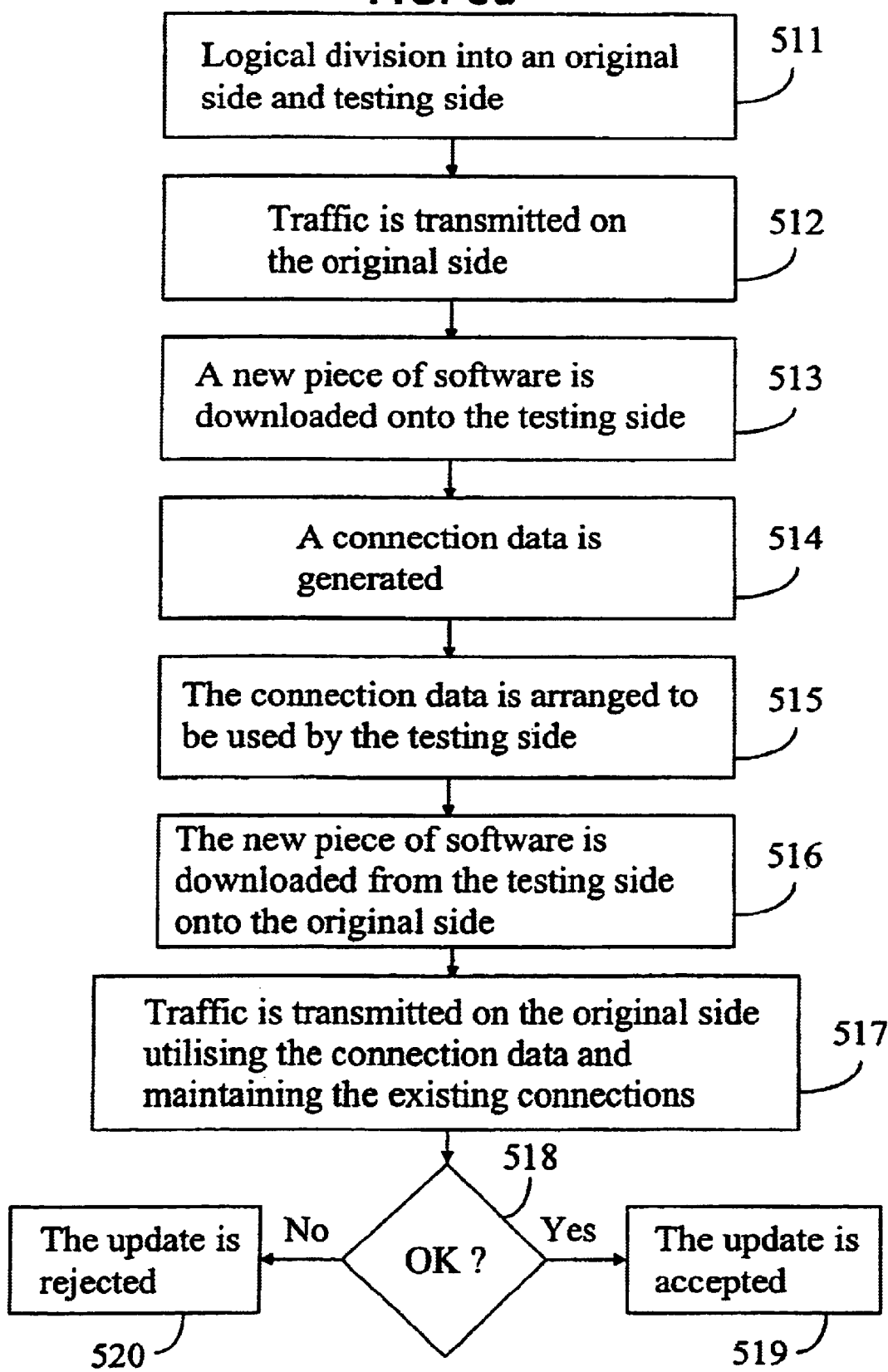

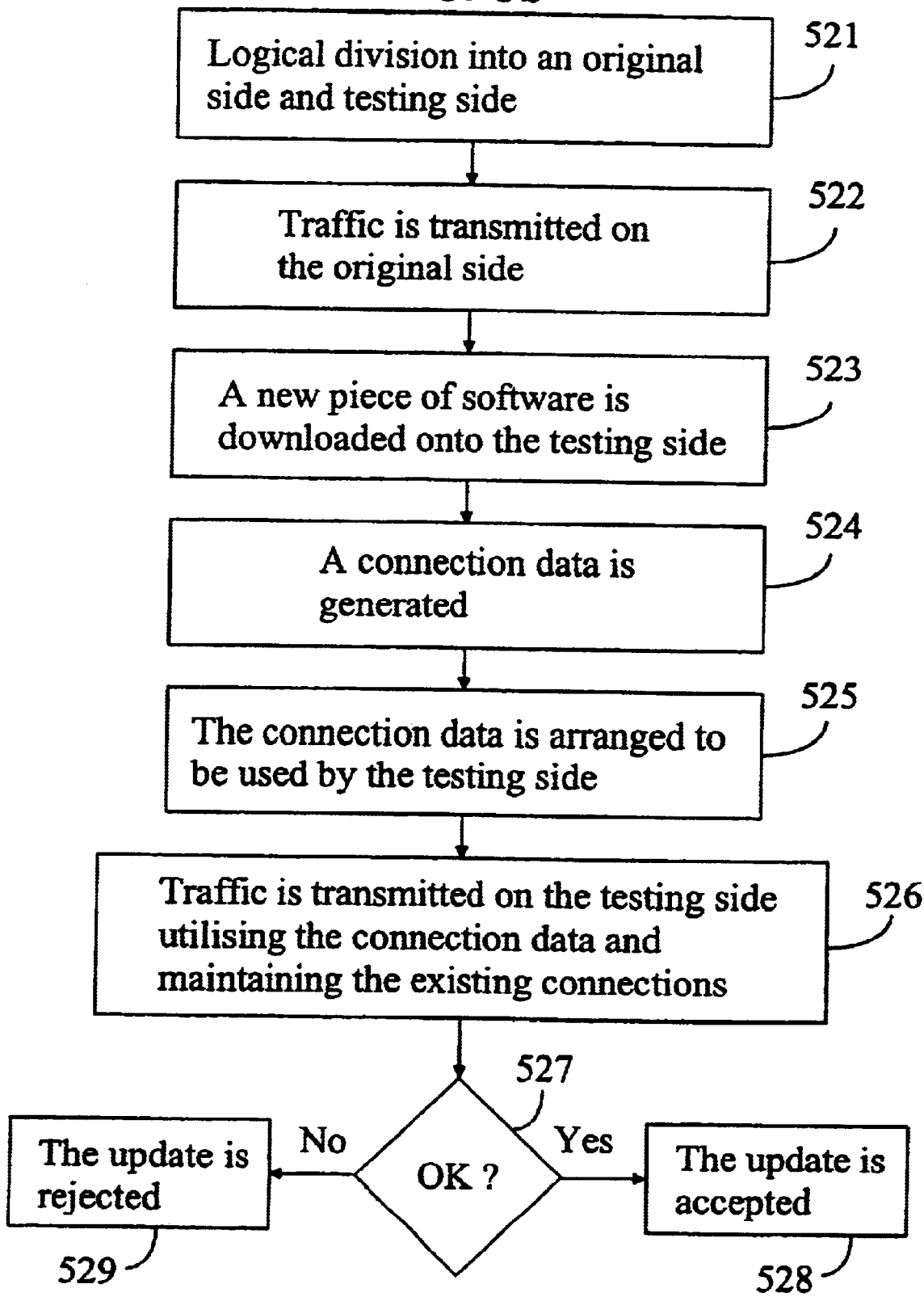

METHOD AND SYSTEM FOR SOFTWARE UPDATING

This application is a continuation of application Ser. No. PCT/FI00/00878 filed Oct. 12, 2000.

SCOPE OF THE INVENTION

The invention relates to telecommunication. In particular, the invention relates to a new and advanced method and system of software updating in a network element of a telecommunication network.

PRIOR ART

A telecommunication network, such as a telephone network typically comprises one or more network elements. A network element is herein used to mean a telecommunications system or a group of systems or a part of a system as well as its peripheral equipment or some other unit in a telecommunication environment that may be managed, monitored or controlled in the network and that has at least one standard interface. A typical example of a network element is a digital telephone exchange. The network element may be divided into two parts: the software and the hardware. Just like any other software configuration, also the software of a network element requires updating every now and then, whether it might be, e.g. for the correction of the programming errors or for the adding of new features. The requirements for the updating process of a network element are, at any rate, remarkably stricter than when updating, e.g. a software of a personal computer.

For example, a modern telephone exchange is a complex entity whose uninterrupted function is a matter of extreme importance for the clients of the operator maintaining it. When updating a piece of software, a new software version is attempted to be tested before its introduction in a most thorough way in order to be able to detect the possible errors before they manage to cause interference to telephone traffic. In addition, the introduction phase of a new piece of software should not cause very much interference to the connections of the network element nor to the function of the network element in general.

Software updates may be divided into two main groups. One group includes so-called minor software updates, characterised in the compatibility of the software with the original software. An example of this is, e.g. a CD update (Change Delivery, CD). The other group includes so-called major software updates, characterised in the incompatibility of the software with the original one. The problems described hereinafter with the solutions presented relate in particular to the major software updates, but the method and system in accordance with the invention may be used also in conjunction with the minor software updates.

Nowadays it is possible to carry out different tests to a new software version before its introduction. Usually the units of the network element are divided into an original side being the ones responsible for the normal traffic of the relevant network element, whereas the units of the testing side are used for the testing of the new software version. An example of the tests that may be carried out are, e.g. alarms. If the alarm system is able to print alarms from the units operating with the new software, so the new software is operational as concerns this part, because specifically the application programs are responsible for the generation of the alarms also in normal activities. In addition, known is a way of giving different commands in the MML language (Man Machine Language, MML), such as printing commands which help to authenticate the data converted from the old software into the new one. Moreover, the download of a new piece of software into a unit is itself a previously known, important test.

An enormous problem associated is, however, that the carrying out of test connections is not possible. One reason for this is that the present network element architectures are not provided with a redundant interface unit that are needed on the testing side in order to establish the test connections. Since the redundant switching field unit to test is not provided with an interface unit connected to it, the switching field unit in question cannot be used for test connections. In other words, the test connections cannot be established because the interface units are not doubled and because both of the units cannot be active at the same time. At any rate, a test connection would be the most comprehensive and efficient way of ensuring the compatibility and effectiveness of a new software packet.

The introduction of a tested software found to be well-operating is nowadays carried out usually with a certain command given in the MML language (Man Machine Language, MML) One known method for the introduction of a new piece of software is as follows: the network elements are logically divided into an original side and testing side. The units of the original side transmit traffic using the original software. In the units of the testing side, a new piece of software is introduced. The units of the testing side begin to transmit traffic using the new software. In case there are no problems occurring, the units of the testing side are finally accepted for use, and the division is eliminated. In other words, the units that belonged to the testing side now carry on transmitting traffic, and the units that belonged to the original side are changed, e.g. into standby units. The introduction is carried out relatively fast, typically in about five minutes. The problem associated, is however, that in conjunction with the introduction of a new piece of software the existing connections of the network element in question are interrupted. The reason for the disconnection of connections is the fact that the interface units are rebooted and transferred from the computer units operating with the old software as well as from the switching field units into the corresponding units operating with the new software. The new units are not heated from the point of view of the connections, and in the units in question the establishing of connections is restarted from the beginning as soon as the units are ready to receive connection requests.

In addition, known is a way of introducing a new piece of software by rebooting the whole system. This method is, however, very slow, taking approximately typically about 10–15 minutes.

The aforementioned problems are therefore to a great extent due to the structural solutions of the present network elements. However, e.g. the ATM technique brings along the network elements of the next generation thus enabling the solving of the present problems. The following section includes a brief description of the features of the ATM technique that in some way or another touch upon the invention.

ATM (Asynchronous Transfer Mode, ATM) is a connection-oriented packet-switched transfer method which is characterised in a data transfer using cells of standard length. The cells consist of a five bit long title and a 48 bit long information part. The title fields comprise a virtual path identifier VPI and virtual channel identifier VCI, a payload type identifier PTI, cell loss priority, CLP and header error control, HEC that makes it possible to correct errors of one bit and detect errors of two bits. In the ATM switch, the cells are transferred from the logical input channel into one or more logical output channels. The logical channel consists of the number of a physical link, such as an optical fibre and the channel identifier on this link, i.e. the VPI/VCI information. One physical medium of transmission, such as an optical fibre may include several virtual paths VP, and each virtual path may include several virtual channels VC.

Since the cells are of standard size, the switching in the ATM switches may be carried out based on the cell header at device level and therefore extremely fast. The cells belonging to different connections are distinguished from each other with the aid of the virtual path and virtual channel identifiers. When establishing the connection, a fixed route is defined through the network, i.e. a virtual connection along which the cells of the connection are route. In the network nodes, the cells are switched based on the VPI/VCI values. The VPI/VCI values of the cells are connection-slot-oriented and therefore tend to change in conjunction with the switching of a VP or VC level. In the end of the transmission the connection is set down.

An ATM protocol is usually described by referring to an ATM protocol model, which is a layer model resembling the OSI model (Open Standards Interconnection, OSI). Uppermost in the model there is the data coming from the user. Below it there is an ATM adaptation layer AAL. Below it there is an ATM layer beneath which there is a physical layer PHY). In addition, the AAL layer is divided into two parts—the SAR layer (Segmentation And Reassembly, SAR) and the CS layer (Convergence Sublayer, CS). Further, the CS layer is divided into two sub layers, which are the SSCS layer (Service Specific Convergence Sublayer, SSCS) and the CPCS layer (Common Part Convergence Sublayer, CPCS).

The ATM adaptation layer slices the frames of the upper layers, places the pieces in the cells and puts the frames together at the other end.

The ATM layer for its part offers the cell transfer service to the AAL layer. It handles solely the cell header being responsible for the cell switching, multiplexing, demultiplexing, the generation and deletion of the cell header as well as generic flow control, GFC) in the user network interface UNI. In addition, the detection and correction of the header errors as well as block synchronization are part of the responsibilities of the ATM layer.

Also the physical layer is divided into two sub layers, the PMD sub layer (Physical Medium Dependent, PMD) which is responsible for the transmission-specific tasks at bit level, and the transmission convergence layer TCS which is responsible for the adaptation of the cells to each transmission protocol as well as cell restriction, error checking of the cell header and balancing the cell rate.

The interface between the integrated circuits and the ATM layer implementing the functions of a physical layer is standardized by the ATM forum with the names UTOPIA, An ATM-PHY Interface Specification, Level 1 and UTOPIA, An ATM-PHY Interface Specification, Level 2, which are hereinafter referred to as UTOPIA Level 1 and UTOPIA Level 2. In practice, a device based on the ATM technique has to be implemented using the ATM micro circuits commercially available that are implementing the interface consistent with the UTOPIA specifications. The interface has become a de facto manufacturing standard which is followed by the component suppliers manufacturing the integrated ATM circuits.

In the UTOPIA interface the data has been defined as 8 or 16 bit long depending on the implemented bit rate (UTOPIA Level 1 and Level 2). In the interface, nothing but the ATM cell data is transferred, and it includes the control, i.e. so-called handshaking signals needed in a two-way transfer. The circuit manufacturers implement their circuits implementing the functions of an ATM layer as hosts, because the UTOPIA specification defines the circuits of an ATM layer as hosts, and because the manufactures are not expected to know in which kind of environment their clients use their circuits. The circuits of a physical layer are correspondingly slaves. The slaves connected to a UTOPIA bus may communicate solely with the host device but not with each other.

THE OBJECTIVE OF THE INVENTION

The objective of the present invention is to disclose a new kind of method and system that eliminates the above disadvantages or at least significantly alleviates them. One specific objective of the invention is to disclose a method and system that enable the carrying out of test connections when testing a new piece of software of a network element in a telecommunication network. Yet another objective of the invention is to disclose a method and system that enable the introduction of a new piece of software and still maintain the existing connections of the network element.

SUMMARY OF THE INVENTION

In the present invention, a piece of software is updated in a network element of a telecommunication network, such as, e.g. a telephone network (e.g. Public Switched Telephone Network, PSTN; Public Land Mobile Network, PLMN; Integrated Services Digital Network, ISDN), or in a network element of a telecommunication network utilizing the IP protocol (Internet Protocol) The network element in question comprises one or more units such as, e.g. computer units which are responsible for the control of functions of the network element; interface units which, e.g. provide the network element with a physical interface to the telecommunication network; multiplexing units which are responsible, e.g. for the multiplexing functions of the network element; and switching field units which are responsible, e.g. for the switching functions of the network element. A unit is herein used to mean a functional configuration, in other words, e.g. the aforementioned units are necessarily not implemented as units being physically separated from each other, instead they may implemented also as an integral configuration. Further, different network elements may comprise different combinations of the aforementioned units. Furthermore, the network element may comprise only one of a certain unit, in which case the unit in question is active, or the network element may comprise several pieces of a certain unit, in which case typically one of the units is active while the rest of them are redundant, i.e. doubled. Typically in a normal state of a network element the active units are responsible for the function of the element in question, and the redundant units are in reserve, in case, e.g. a failure should occur.

The units are logically divided into an original side and testing side. Logical division means division into two sides logically separated from each other, which may be implemented, e.g. in such a way that the units of one side are eliminated from the computer addressing tables of the logical addressing. In other words, the division may be made using an address modification. Furthermore, the division may be implemented by inhibiting the physical connection between some units, i.e. data arriving from a certain unit is not accepted. The consequence of such a division is that no logical level computer addressing is used between the units of the original side and testing side. In other words, a message cannot be sent from the original side to the testing side using a logical address and vice versa, because the units of the sides in question are invisible to each other what concerns logical addresses. Instead of that, the boundary line between the units of the original and the testing side may be crossed using a physical level computer addressing. It is to be noted that the logical division may be made either at network element level, in which case the network element is logically divided into an original side and testing side, or the logical division may be made at unit level, in which case one or more units are divided into an original side and testing side. Thereby the term "unit of an original side" refers both to a whole unit that, according to the logical division made at network element level, is arranged to belong to the original side, and an original side of such a whole unit which unit, according to the division made at unit level, is divided into an original side and testing side. Correspondingly, the term "unit of a testing side" refers both a whole unit that, according to the logical division made at network element level, is arranged to belong to the testing side, and a testing side of such a whole unit which unit, according to the division made at unit level, is divided into an original side and testing side.

If the logical division is made at network element level, then the advantageously active units are transferred to the original side, and the redundant units are transferred to the testing side. The division may, however, be made in some other way, too. It is, for example, possible to transfer to the testing side also non-doubled interface units in case they are not needed on the original side or in case there are redundant interface units on the original side for some other reason. The same applies to the other units as well. Moreover, it is possible to make modifications to the division later on.

The original software is maintained in the units of the original side, and the units in question are used to carry out the traffic transmitting tasks of a network element. In addition, if necessary, the aforementioned units are used to carry out other functions related to normal operation of the aforementioned network element such as, e.g. billing, compiling statistics, adding/deletion of subscribers and/or updating the visitor location register. One or more units of the testing side are loaded with the new software. In a preferred case, the new piece of software is downloaded into all the units including software of the testing side, such as computer units. Further, the new piece of software downloaded into the units of the testing side is tested.

In accordance with the invention, one or more test connections are directed into the units of the testing side loaded with the new piece of software when testing a new piece of software downloaded into the units in question. The test connection may comprise, e.g. speech, data, image and/or network management messages etc. In this way, the aforementioned new piece of software downloaded into the units of the testing side may be tested more comprehensively than in the prior-art solutions.

In an embodiment of the invention, the network element comprises an active interface unit, active and redundant multiplexing unit as well as an active and redundant switching field unit. In conjunction with the aforementioned logical division, the active units in question are arranged to belong to the original side, and the redundant units in question are arranged to belong to the testing side. One or more test connections are generated which test connections then are directed into the units of the testing side loaded with the new piece of software via the aforementioned active interface unit and redundant multiplexing unit.

In an embodiment of the invention, the network element comprises at least one active and at least one redundant interface unit, at least one active and at least one redundant multiplexing unit, as well as at least one active and at least one redundant switching field unit. In conjunction with the aforementioned logical division, the active units in question are arranged to belong to the original side, and the redundant units in question are arranged to belong to the testing side. One or more test connections are generated which test connections then are directed to the units of the testing side loaded with the new software via the redundant interface unit in question.

In an embodiment of the invention, in some unit of the network element, there is a piece of software arranged for generating test connections, and the aforementioned test connections are generated using the software for generating in question. Advantageously the software for generating test connections is arranged in the interface unit that is used to control the test connections.

In an embodiment of the invention, a second network element is connected to the network element. In the aforementioned second network element, a software for generating test connections is arranged, and the aforementioned test connections are generated using the software for generating in question.

In an embodiment of the invention, some unit of the aforementioned network element is provided with test equipment, and the aforementioned test connections are generated using the test equipment in question.

In the present invention, a piece of software is updated in a network element of a telecommunication network, such as, e.g. a telephone network (e.g. Public Switched Telephone Network, PSTN; Public Land Mobile Network, PLMN; Integrated Services Digital Network, ISDN), or in a network element of a telecommunication network utilizing the IP protocol (Internet Protocol). The network element in question comprises one or more units. The units are logically divided into an original side and testing side. The original software is maintained in the units of the original side, and the units in question are used to carry out the traffic transmitting tasks of a network element. In addition, the aforementioned units are used to carry out other functions related to normal operation of the aforementioned network element. One or more units of the testing side are loaded with the new software. In a preferred case, the new piece of software is downloaded into all units including software of the testing side, such as computer units. The new software is introduced. After this, it is found out whether the units loaded with the new software are operating in a desired way. In case the units in question are operating in a desired way, the update is accepted. Upon accepting the update the aforementioned logical division is usually eliminated, and the units loaded with the original software may serve as, e.g. standby units, and the units loaded with the new software take over the responsibility for the tasks of the network element. If the units in question, however, do not operate in a desired way, then the update is rejected. In that case, the aforementioned logical division may be eliminated in such a way that the units loaded with the original software are responsible for the tasks of the network element, just like before the update. One typical reason for the possible reject are the defects detected in the new software such as, e.g. the failure to work of billing.

In accordance with the invention, when introducing a new piece of software the following actions are taken. To begin with, a connection data is generated using the original software. The connection data comprises predetermined information about the existing connections of the network element in question with the help of which the new software may find out how the hardware connected to the network element has been formatted with the original software. The aforementioned information may not be found out, e.g. by examining the registers at device level, because a function of a upper level such as "connect the channels A and B with the traffic parameters x, y, z" may generate several formatting tasks at device level in several different computer units. These formatting tasks depend on each other, and this relation is not be found out by examining the registers at device level. Because of this, the connection data comprises switching information of a upper level with its traffic parameters, in which case the new software version may later read and utilise it. In addition, the connection data comprises low-level information of the fact of how the connection has been switched on at device level in order to be able to re-establish the connection with the new software using the same already existing device-level connection. The connection data comprises information about switched virtual circuits (SVC) which switched virtual circuit means a virtual connection that is dynamically set up according to practical need and set down at the end of the transmission. In addition, the connection data comprises information of the permanent virtual circuits (PVC) which virtual connection means a virtual connection that is non-switched with no signalling. If necessary, the information included in the connection data may be converted in a way required by the new software.

Further in accordance with the invention, when introducing a new piece of software the connection data is arranged in such a way that the units of the testing side have access to it, which is carried out by saving the connection data in a file stored on a hard disk or some other equivalent storage medium or, e.g. on a memory of a computer unit belonging to the testing side. Furthermore in accordance with the invention, when introducing a new piece of software the new piece of software is activated in which activating process the aforementioned connection data is made use of in order to maintain the existing connections of the network element.

In an embodiment of the invention, in the activation process of a new piece of software, the new software utilising the connection data is downloaded from the testing side into one or more units of the original side, and in the activation process of the new software, the traffic transmitting tasks of the network element are continued using the original units loaded with the new software utilising the connection data.

In an embodiment of the invention, in the activation process of a new piece of software, the traffic transmitting responsibilities are taken by the units of the testing side loaded with the new software utilising the connection data.

According to one aspect of the present invention, when downloading the software from the testing side into the units of the original side the new software is copied using message communication links. In that case, the copying is carried out from a fast mass memory, such as, e.g. random access memory (RAM), and therefore faster than, e.g. from a hard disk.

According to another aspect of the present invention, a piece of software is updated in a network element of a telecommunication network, such as, e.g. a telephone network (e.g. Public Switched Telephone Network, PSTN; Public Land Mobile Network, PLMN; Integrated Services Digital Network, ISDN), or in a network element of a telecommunication network utilizing the IP protocol (Internet Protocol). The network element in question comprises one or more units. The units are logically divided into an original side and testing side. The original software is maintained in the units of the original side, and said units of the original side are used to carry out current traffic transmitting tasks of said network element. In other words, said units of the original side manage such connections which existed at the moment the logical division was performed. In addition, said units may be used to carry out other functions related to normal operation of said network element. One or more units of the testing side are loaded with a new piece of software. In a preferred case, the new piece of software is loaded into all units of the testing side comprising software, such as computer units. The new software is introduced. After this, it is found out whether the units loaded with the new software are operating in a desired way. In case the units in question are operating in a desired way, the update is accepted. Upon accepting the update the aforementioned logical division is usually eliminated, and the units loaded with the original software may serve as, e.g. standby units, and the units loaded with the new software take over the responsibility for the tasks of the network element. If the units in question, however, do not operate in a desired way, then the update is rejected. In that case, the aforementioned logical division may be eliminated in such a way that the units loaded with the original software are responsible for the tasks of the network element, just like before the update. One typical reason for the possible reject are the defects detected in the new software such as, e.g. the failure to work of billing.

In accordance with the invention, when introducing the new piece of software the following actions are taken. Units are logically divided from the original side into the testing side gradually one at a time as their respective current traffic transmitting tasks are finished. By a traffic transmitting task being finished it is referred both to a case in which a task is concluded (for example, the corresponding connection on-hooks) and to a case in which a task is interrupted (for example, by a third party such as the service provider operating said network element). After said units are logically divided into the testing side, they are loaded with the new software. Forthcoming traffic transmitting tasks of the network element are performed using said units logically divided into the testing side and loaded with the new software. Also, if there are redundant units at the moment of the logical division, they are preferably logically divided into the testing side immediately, thus making it possible for the logically divided network element to accept new connections at once.

In an embodiment of the invention, the aforementioned logical division is made inside the units. In other words, the original and new software version are located physically in the same unit.

In an embodiment of the invention, the network element is implemented using a packet-switched technique, such as the ATM technique.

In an embodiment of the invention, the network element is a digital telephone exchange.

In an embodiment of the invention, the active interface unit is connected to the multiplexing units via the UTOPIA Level 2 interface.

In an embodiment of the invention, each multiplexing unit has got at least one vacant UTOPIA address available for testing.

As compared with prior art the present invention provides the advantage that it makes it possible to carry out test connections when testing a new piece of software in a network element of a telecommunications network, which previously has been impossible. The fact that the carrying out of test connections becomes possible leads on the other hand to a situation where new software may be tested before introduction far more widely and comprehensively than before. This on the other hand reduces error and failure conditions caused by defective testing. Moreover, thanks to the invention, a new piece of software may be introduced into the network element of a telecommunications network and at the same time maintain the existing connections. This on the other hand helps to improve the quality of the services provided by, e.g. a telephone operator to its clients.

LIST OF ILLUSTRATIONS

In the following section, the invention will be described by way of example with reference to the embodiments illustrated in the attached drawing, in which:

FIG. 1c shows a system of the invention in schematic form;

FIG. 2 shows a system of the invention in schematic form;

FIG. 4 shows a system of the invention in schematic form;

FIG. 5a shows a system of the invention in schematic form;

FIG. 5b shows a system of the invention in schematic form.

DETAILED DESCRIPTION OF THE INVENTION

Figure 1A:
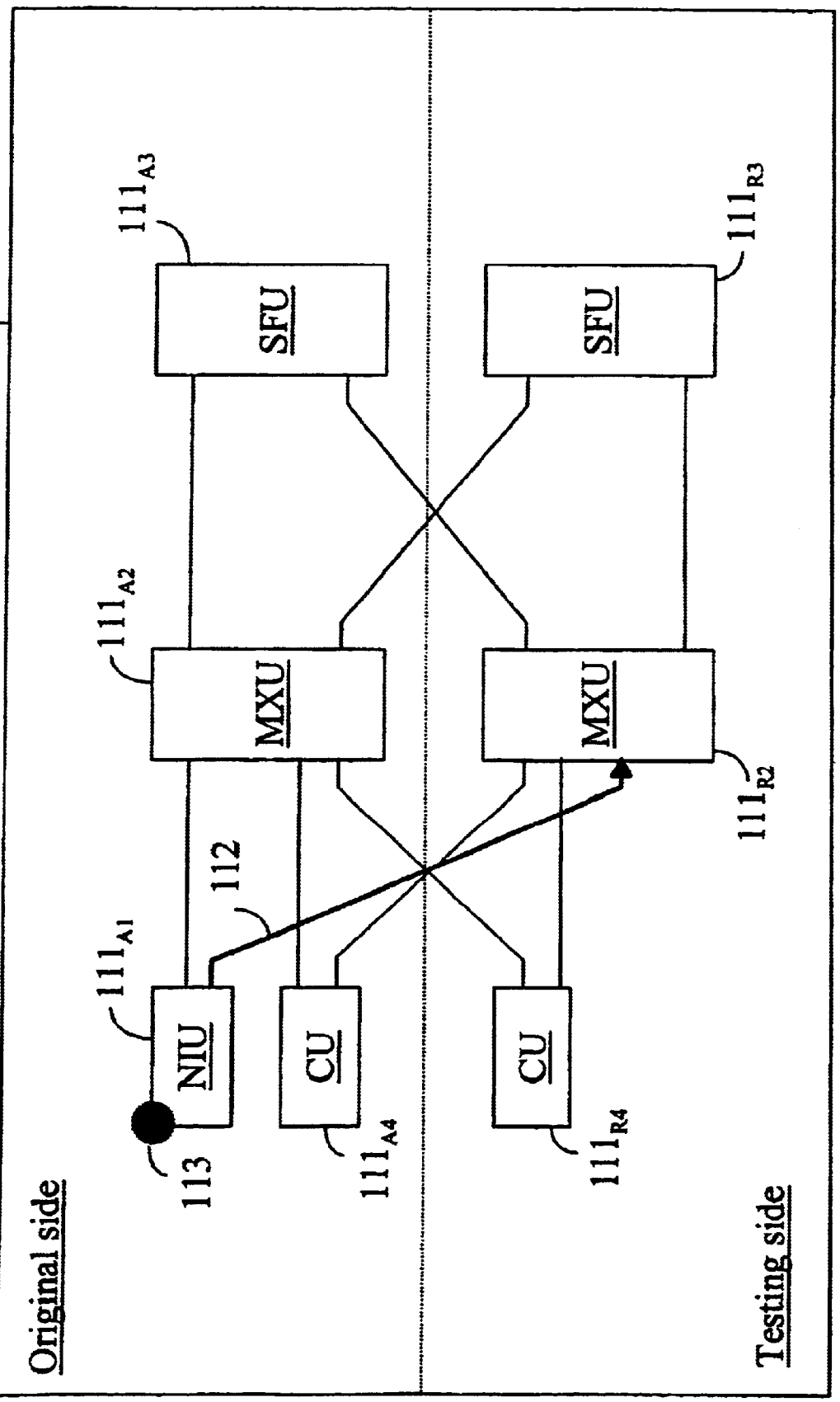
FIG. 1a shows a system of the invention in schematic form.

FIG. 1a is a block diagram illustrating, by way of example, the components of one system of the invention. The system as described in FIG. 1a makes it possible to direct test connections into the units of the testing side loaded with the new software without having to use a redundant interface unit. The system comprises a network element 110, comprising units that are logically divided into an original side and testing side. The network element 110 is, e.g. a digital telephone exchange. In the exemplary case as illustrated in FIG. 1a, the units are an active computer unit $111_{A4}$, active interface unit $111_{A1}$, active multiplexing unit $111_{A2}$, active switching field unit $111_{A3}$, redundant computer unit $111_{R4}$, redundant multiplexing unit $111_{R2}$ and redundant switching field unit $111_{R3}$. It is to be noted that the configuration as shown by FIG. 1a is a simplified example to help to clarify the matter. In practice, there are more computer units than illustrated in FIG. 1a. In the units of the original side $111_{A1 \ldots A4}$, the original software $110^1$ is maintained, and the units in question are used, e.g. to carry out the traffic transmitting tasks of the network element, and generally also other functions related to normal operation of the aforementioned network element such as, e.g. billing, compiling statistics, adding/deletion of subscribers and/or updating the visitor location register. The new pieces of software $110^2$ is downloaded into one or more units of the testing side $111_{R2} \ldots _{R4}$. In a preferred case, the new piece of software $110^2$ is downloaded into all the units including software of the testing side. Further, the new piece of software $110^2$ is tested in the units of the testing side in question. It is to be noted that although it is assumed in FIG. 1a that the logical division would have been made at network element level, the division may, nevertheless, be made at unit level. This happens, e.g. by dividing each unit including new software into an original side and testing side. Still also in that case, the actions to be taken are effected analogously to the division made at element level.

In accordance with the invention, a software for generating test connections 113 is downloaded into, e.g. an active interface unit $111_{A1}$ that is used to generate test connections, e.g. by using typical call initiation messages. The test connection may comprise, e.g. speech, data, image, and/or network management messages, etc. Further in accordance with the invention, the test connections 112 are directed to the units of the testing side, such as, e.g. the redundant computer unit $111_{R4}$, loaded with the new piece of software $110^2$, via the aforementioned active interface unit $111_{A1}$ and the redundant multiplexing unit $111_{R2}$. It is worth noting that instead of the software for generating 113 also separate test equipment 113 may be used which is arranged, e.g. in conjunction with the interface unit $111_{A1}$ and using which the test connections are generated.

The system as described in FIG. 1a provides the advantage that because an active interface unit $111_{A1}$ arranged in the original side is used, the interface unit in question functions in a normal way. In addition, the system in question provides the advantage that no doubled interface units are needed that in a normal state of network element would be redundant.

Figure 1B:
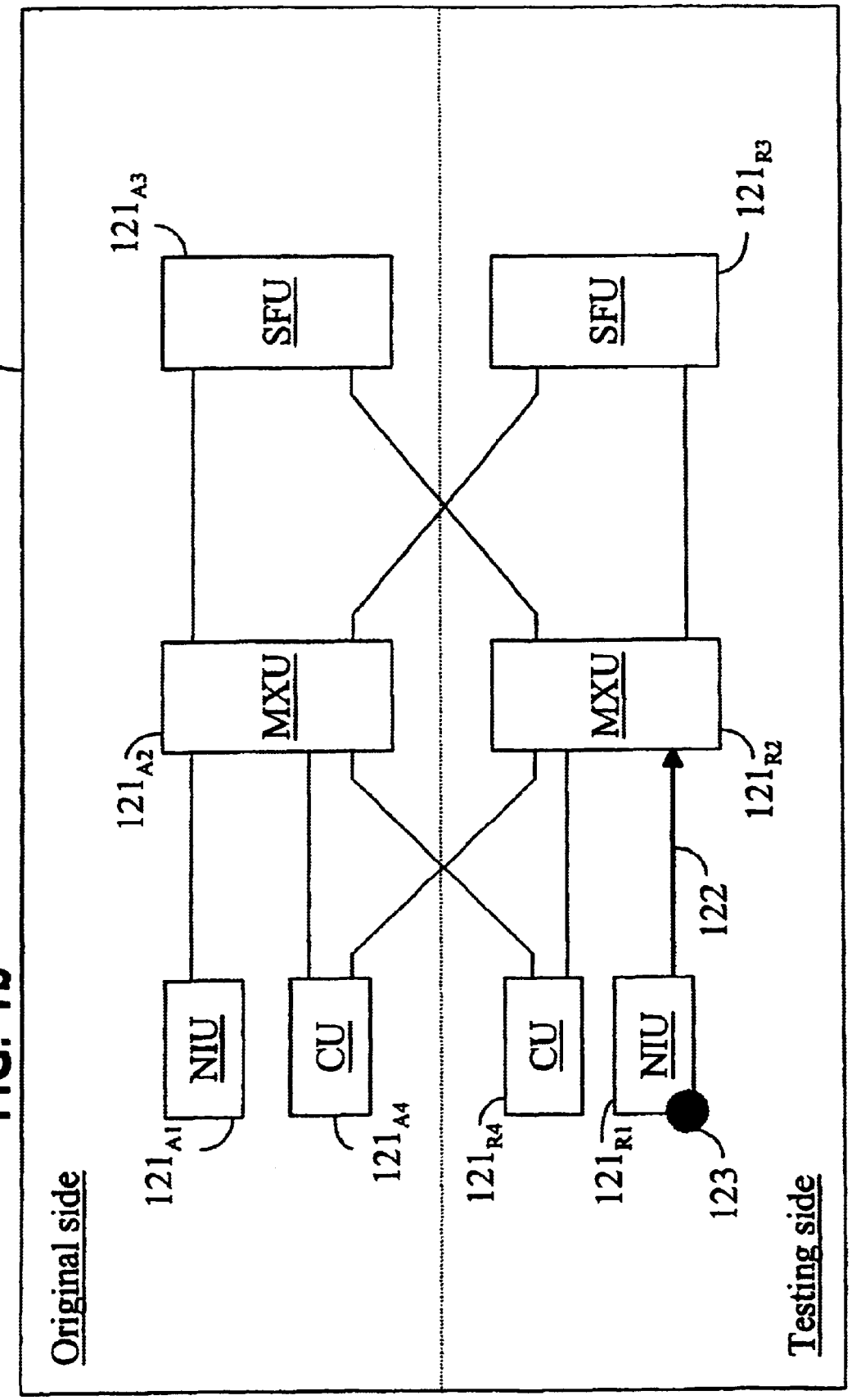
FIG. 1b shows a system of the invention in schematic form.

FIG. 1b is a block diagram illustrating, by way of example, the components of one system of the invention. The system as described in FIG. 1b makes it possible to direct test connections into the units of the testing side loaded with the new software by making use of the redundant interface unit. The system comprises a network element 120, comprising units that are logically divided into an original side and testing side. The network element 120 is, e.g. a digital telephone exchange. In the exemplary case as illustrated in FIG. 1b, the units are an active computer unit $121_{A4}$, active interface unit $121_{A1}$, active multiplexing unit $121_{A2}$, active switching field unit $121_{A3}$, a redundant computer unit $121_{R4}$, redundant multiplexing unit $121_{R2}$, redundant switching field unit $121_{R3}$ and redundant interface unit $121_{R1}$. It is to be noted that the configuration as shown by FIG. 1b is a simplified example to help to clarify the matter. In practice, there are more computer units than illustrated in FIG. 1b. In the units of the original side $121_{A1 \ldots A4}$, the original software $120^1$ is maintained, and the units in question are used, e.g. to carry out the traffic transmitting tasks of a network element, and generally also other functions related to normal operation of the aforementioned network element such as, e.g. billing, compiling statistics, adding/deletion of subscribers and/or updating the visitor location register. The new piece of software $120^2$ is downloaded into one or more units of the testing side $121_{R1 \ldots R4}$. In a preferred case, the new piece of software $120^2$ is downloaded into all the units including software of the testing side. Further, the new piece of software $120^2$ is tested in the units of the testing side in question. It is worth noting that although it is assumed in FIG. 1b that the logical division would have been made at network element level, the division may, nevertheless, be made at unit level. This happens, e.g. by dividing each unit including the software into an original side and testing side. Still also in that case, the actions to be taken are effected analogously to the division made at element level.

In accordance with the invention, into a redundant interface unit $121_{R1}$, a software for generating test connections 123 is downloaded that is used to generate test connections, e.g. by using typical call initiation messages. The test connection may comprise, e.g. speech, data, image, and/or network management messages, etc. Further in accordance with the invention, the test connections 122 are directed to the units of the testing side, such as, e.g. the redundant computer unit $121_{R4}$, loaded with the new piece of software $120^2$ via the aforementioned redundant interface unit $121_{R1}$. It is worth noting that instead of the software for generating 123 also separate test equipment 123 may be used which is arranged, e.g. in conjunction with the redundant interface unit $121_{R1}$ and using which the test connections are generated.

As compared with the system illustrated in FIG. 1a the system illustrated in FIG. 1b provides, among other things, the advantage that the software for generating test connections 123 becomes more simplified because there is no need to surpass the boundary line between the original side and testing side.

FIG. 1c is a block diagram illustrating, by way of example, the components of one system of the invention. More specifically, FIG. 1c illustrates one alternative way of implementing the generation of the test connections as described in FIGS. 1a and 1b. According to FIG. 1c, the system comprises in addition to the network element to update 130, also a second network element 140 one unit of which contains a software for generating test connections 143 downloaded into it. Via the network connection 150 the test connections are transmitted to the network element to update 130.

FIG. 2 is a block diagram illustrating, by way of example, the components of one system of the invention. The arrangement as described in FIG. 2 makes it possible to introduce a new software version into the network element and at the same time maintain the existing connections of the network element in question. The arrangement comprises a network element 200, comprising units that are logically divided into an original side and testing side. The network element 200 is, e.g. a digital telephone exchange. In the exemplary case as illustrated in FIG. 2, the units are an active computer unit $201_{A4}$, active interface unit $201_{A1}$, active multiplexing unit $201_{A2}$, active switching field unit $201_{A3}$, a redundant computer unit $201_{R4}$, redundant multiplexing unit $201_{R2}$, redundant switching field unit $201_{R3}$ and a redundant interface unit $201_{R1}$. It is worth noting that the configuration as shown by FIG. 2 is a simplified example to help to clarify the matter. In practice, there are more computer units than illustrated in FIG. 2. In the units of the original side $201_{A1}$ ... $_{A4}$, the original software $200^1$ is maintained, and the units in question are used, e.g. to carry out the traffic transmitting tasks of the network element, and generally also other functions related to normal operation of the aforementioned network element such as, e.g. billing, compiling statistics, adding/deletion of subscribers and/or updating the visitor location register. The new piece of software $200^2$ is downloaded into one or more units of the testing side $200_{R1} ... _{R4}$. In a preferred case, the new piece of software $200^2$ is downloaded into all the units including software of the testing side. It is worth noting that although it is assumed in FIG. 1b that the logical division would have been made at network element level, the division may, nevertheless, be made at unit level. This happens, e.g. by dividing each unit including the software into an original side and testing side. Still also in that case, the actions to be taken are effected analogously to the division made at element level.

In accordance with the invention, at the beginning, a connection data 202 is generated. The connection data 202 comprises predetermined information about the existing connections of the network element in question. With the help of the aforementioned information the new piece of software $200^2$ may find out how the hardware connected to the network element has been formatted with the original software $200^1$. The connection data 202 comprises switching information of an upper level with is traffic parameters, in which case the new software version $200^2$ may later read it and utilise it. In addition, the connection data 202 comprises low-level information of the fact of how the connection has been switched on at device level in order to be able to re-establish the connection with the new piece of software $200^2$ using this existing connection of device level. If necessary, the information included in the connection data 202 may be converted in a way required by the new piece of software $200^2$. The connection data 202 is usually arranged utilising the original software $200^1$. After the connection data 202 has been established, it has to be made available for the units of the testing side $201_{R1} ... _{R4}$, which is carried out by saving the connection data 202 in a file stored on a hard disk or some other equivalent storage medium or, e.g. on a memory of a computer unit belonging to the testing side. In the example of FIG. 2, the connection data 202 has been stored on the memory of a redundant computer unit $201_{R4}$. The new piece of software downloaded into the units of the testing side $201_{R1} ... _{R4}$ is introduced maintaining the existing connections at the same time, which may be implemented in two different ways. The first alternative is to download the new piece of software $200^2$ and connection data 202 from the testing side onto the original side using, e.g. message communication links $200^3$, and the traffic transmitting tasks of the network element 200 are continued using the units of the original side $201_{A1} ... _{A4}$ in question loaded with the new piece of software $200^2$ which new piece of software $200^2$ utilises the connection data 202 in such a way that the existing connections of the network element are maintained. The second alternative is that the traffic transmitting tasks are taken by the units of the testing side $201_{R1} ... _{R4}$ loaded with the new piece of software $200^2$ which new piece of software $200^2$ utilises the connection data 202 in such a way that the existing connections of the network element 200 are maintained.

Figure 3:
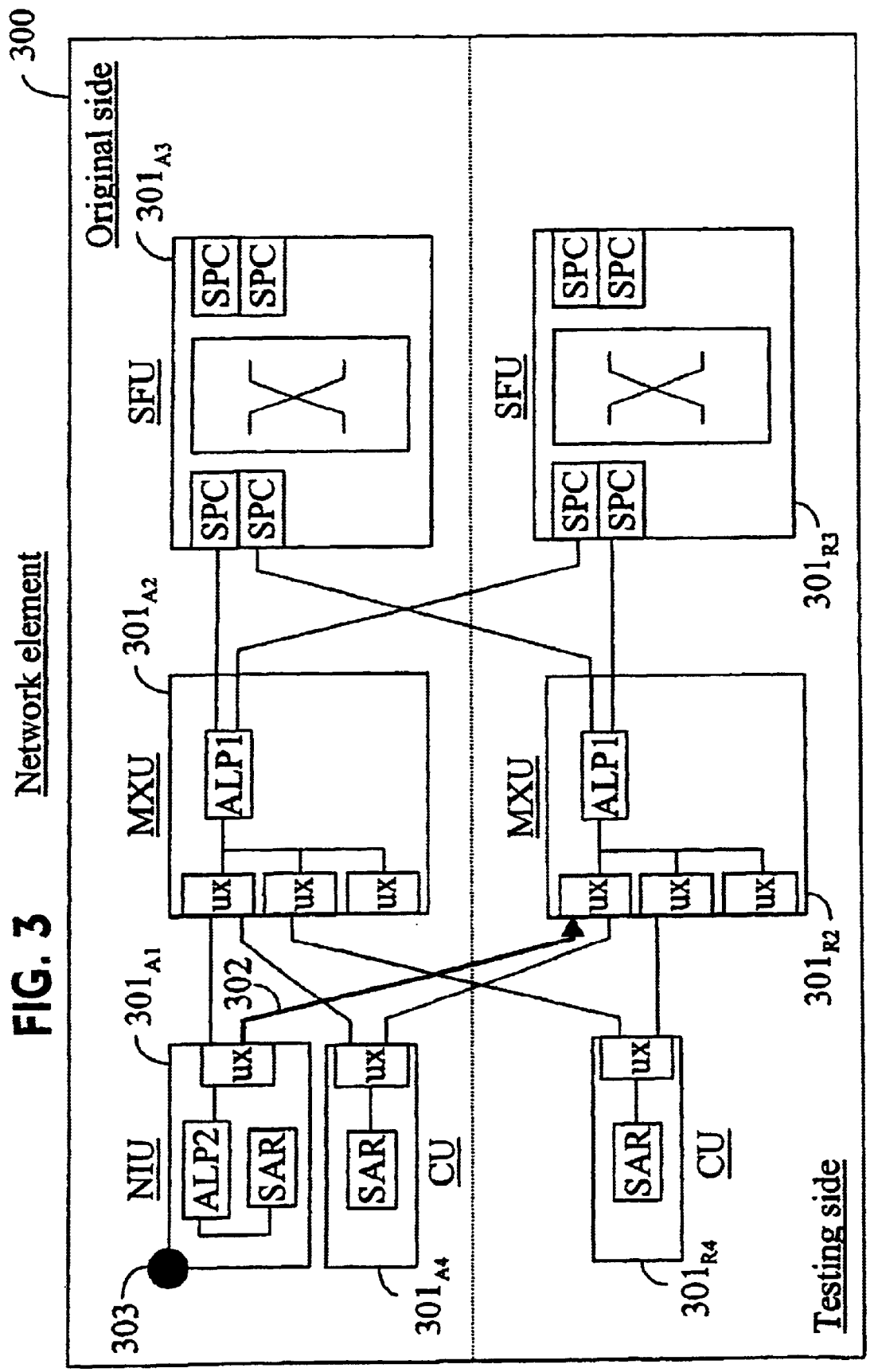
FIG. 3 shows a system of the invention in schematic form.

FIG. 3 is a block diagram illustrating, by way of example, a system similar to the one described in FIG. 1 implemented using the ATM technique. Naturally, also the systems as described in FIGS. 1b and 2 may be implemented in a similar way using the ATM technique. Further, the solution as presented in FIG. 3 is only one way of implementing the invention by way of ATM technique. Many other variations are also possible. Further, instead of the ATM technique some other packet-switched technique may be used, such as the Frame Relay technique. The active interface unit $301_{A1}$ comprises a circuit SAR(Segmentation And Reassembly, SAR), a circuit ALP2 (Level 2 ATM Layer Processing, ALP2) and a UTOPIA interface UX (UTOPIA Extender, UX). Using the SAR circuit tasks of the SAR layer, which was described in the foregoing, are performed. Using the ALP2 circuit tasks of the ATM layer, which was described in the foregoing are performed. The UX interface provides a UTOPIA Level 2 interface. The active computer unit $301_{A4}$ comprises a SAR circuit and a UX interface using which SAR circuit tasks of the above-mentioned SAR layer are performed and which UX interface provides UTOPIA Level 2 interface. The active multiplexing unit $301_{A2}$ comprises an ALP1 circuit (Level 1 ATM Layer Processing, ALP1) as well as a set of UX interfaces. The UX interfaces provide a UTOPIA Level 2 interface. The active multiplexing unit $301_{A2}$ in question has got at least one vacant UTOPIA address available for testing. The active switching field unit $301_{A3}$ in question comprises, in addition to the actual switching field, a set of SPC converters (Serial Parallel Converter, SPC) that provide a serial parallel conversion. The redundant computer unit $301_{R4}$ comprises a SAR circuit and UX interface using which SAR circuit tasks of the above-mentioned SAR layer are performed and which UX interface provides a UTOPIA Level 2 interface. The redundant multiplexing unit $301_{R2}$ comprises an ALP1 circuit (Level 1 ATM Layer Processing, ALP1) as well as a set of UX interfaces. The UX interfaces provide a UTOPIA Level 2 interface. The redundant multiplexing unit $301_{R2}$ in question has got at least one vacant UTOPIA address available for testing. The redundant switching field unit $301_{R3}$ comprises, in addition to the actual switching field, a set of SPC converters (Serial Parallel Converter, SPC) that provide a serial parallel conversion.

FIG. 4 is a flow chart illustrating, by way of example, one method of the invention by means of which method test connections are directed into the units of the testing side of the network element loaded with the new piece of software. In phase 401, the units of the network element are logically divided into an original side and testing side. In phase 402, in the units of the original side, the original software is maintained, and the units in question are used to carry out the traffic transmitting tasks of the network element, and generally also other functions related to normal operation of the aforementioned network element such as, e.g. billing, compiling statistics, adding/deletion of subscribers and/or updating the visitor location register. In phase 403, the new piece of software is downloaded into one or more units of the testing side. In a preferred case, the new piece of software is downloaded into all the units including software of the testing side such as, e.g. computer units. In phase 404, in accordance with the invention, test connections are directed into the units of the testing side loaded with the new piece of software. The test connections may comprise, e.g. speech, data, image, and/or network management messages, etc. In phase 405, the units of the testing side loaded with the new piece of software are tested in different ways including the aforementioned test connections. The test connections may be directed to the testing side either via the active interface unit or the redundant multiplexing unit, or alternatively via the redundant interface unit.

FIG. 5a is a flow chart illustrating, by way of example, one method of the invention by means of which method a new piece of software is introduced into a network element. In phase 511, the units of the network element are logically divided into an original side and testing side. In phase 512, in the units of the original side, the original software is maintained, and the units in question are used to carry out the traffic transmitting tasks of the network element, and generally also other functions related to normal operation of the aforementioned network element such as, e.g. billing, compiling statistics, adding/deletion of subscribers and/or updating the visitor location register. In phase 513, the new piece of software is downloaded into one or more units of the testing side. In a preferred case, the new piece of software is downloaded into all the units of the testing side including software such as, e.g. computer units.

In accordance with the invention, in phase 514, a connection data is generated using the original software. The connection data comprises predetermined information of the existing connections of the network element in question with the help of which information the new software may find out how the hardware connected to the network element has been formatted with the original software. The connection data comprises switching information of an upper level with its traffic parameters, in which case the new software version may later read it and utilise it. In addition, the connection data comprises low-level information of the fact of how the connection has been switched on at device level in order to be able to re-establish the connection with the new piece of software using this existing connection of device level. If necessary, the information included in the connection data may be converted in a way required by the new piece of software.

Further in accordance with the invention, in phase 515, the connection data is arranged in such a way that the units of the testing side have access to it, which is carried out by saving the connection data in a file stored on a hard disk or some other equivalent storage medium or, e.g. on a memory of a computer unit belonging to the testing side. In phase 516, the new piece of software utilising connection data is downloaded from the testing side into one or more units of the original side. In phase 517, the traffic transmitting tasks of the network element are continued using the units of the original side loaded with the new piece of software utilising the connection data, and the existing connections are maintained at the same.

After this, in phase 518, it is found out whether the units loaded with the new piece of software are operating in a desired way. If the units in question are operating in a desired way, then in phase 519, the update is accepted. Upon accepting the update the aforementioned logical division is usually eliminated, and the units loaded with the original software may serve as, e.g. standby units, and the units loaded with the new software take over the responsibility for the tasks of the network element. If the units in question, however, do not operate in a desired way, then in phase 520, the update is rejected. In that case, the aforementioned logical division may be eliminated in such a way that the units loaded with the original software are responsible for the tasks of the network element, just like before the update. One typical reason for the possible reject are the defects detected in the new software such as, e.g. a failure to work of billing. This makes it possible to return to the original software version. This may be well-grounded, e.g. in a case when the new software version is not operating in a satisfactory way in the network environment in question or in conjunction with the data converted from the original software. Usually, a new software version is tested by the supplier, but in a different network, device and data environment.

FIG. 5b is a flow chart illustrating, by way of example, one method of the invention by means of which method a new piece of software is introduced into the network element. In phase 521, the units of the network element are logically divided into an original side and testing side. In phase 522, in the units of the original side, the original software is maintained, and the units in question are used to carry out the traffic transmitting tasks of the network element, and generally also other functions related to normal operation of the aforementioned network element such as, e.g. billing, compiling statistics, adding/deletion of subscribers and/or updating the visitor location register. In phase 523, the new piece of software is downloaded into one or more units of the testing side. In a preferred case, the new piece of software is downloaded into all of the units including software such as, e.g. computer units.

In accordance with the invention, in phase 524, a connection data is generated using the original software. The connection data comprises predetermined information of the existing connections of the network element in question with the help of which the new software may find out how the software connected to the network element has been formatted with the original software. The connection data comprises switching information of an upper level with its traffic parameters, in which case the new software version may later read it and utilise it. In addition, the connection data comprises low-level information of the fact of how the connection has been switched on at device level in order to be able to re-establish the connection with the new piece of software using this existing connection of device level. If necessary, the information included in the connection data may be converted in a way required by the new piece of software.

Further in accordance with the invention, in phase 525, the connection data is arranged in such a way that the units of the testing side have access to it, which is carried out, e.g. by saving the connection data in a file stored on a hard disk or some other equivalent storage medium or, e.g. on a memory of a computer unit belonging to the testing side. In phase 526, the traffic transmitting tasks of the network element are continued using the units of the original side loaded with the new piece of software which new piece of software utilises the connection data in such a way that the existing connections of the network element in question are maintained.

After this, in phase 527, it is found out whether the units loaded with the new piece of software are operating in a desired way. If the units in question are operating in a desired way, in phase 528, the update is accepted. Upon accepting the update the aforementioned logical division is usually eliminated, and the units loaded with the original software may serve as, e.g. standby units, and the units loaded with the new software take over the responsibility for performing tasks of the network element. If the units in question, however, do not operate in a desired way, then in phase 529, the update is rejected. In that case, the aforementioned logical division may be eliminated in such a way that the units loaded with the original software are responsible for the tasks of the network element, just like before the update. One typical reason for the possible reject are the defects detected in the new software such as, e.g. the failure to work of billing. This makes it possible to return to the original software version. This may be well-grounded, e.g. in a case when the new software version is not operating in a satisfactory way in the network environment in question or in conjunction with the data converted from the original software. Usually, a new software version is tested by the supplier, but in a different network, device and data environment.

The invention is not restricted to the examples of its embodiments described above, instead numerous modifications are possible without departing from the scope of the inventive idea defined by the claims.

What is claimed is:

1. A method for updating software in a network element of a telecommunication network which network element comprises units and which method comprises the following steps:

the units are logically divided into an original side and testing side, in the units of the original side, the original software is maintained, traffic transmitting tasks of the network element are performed using the units of the original side, one or more units of the testing side are loaded with a new piece of software, and the new piece of software loaded into the units of the testing side is tested, characterised in that the method further comprises the following step:

one or more test connections are directed to the units of the testing side loaded with the new piece of software when testing the new piece of software loaded into the units in question.

2. A method as defined in claim 1, characterised in that the method further comprises the following steps:

an active interface unit, active multiplexing unit and active switching field unit are logically divided into the original side, a redundant multiplexing unit and redundant switching field unit are logically divided into the testing side, one or more test connections are generated, and said test connections are directed to the units of the testing side loaded with the new piece of software via said active interface unit and redundant multiplexing unit.

3. A method as defined in claim 1, characterised in that the method further comprises the following steps:

an active interface unit, active multiplexing unit and active switching field unit are logically divided into the original side, a redundant multiplexing unit, redundant multiplexing unit and redundant switching field unit are logically divided into the testing side, one or more test connections are generated, and said test connections are directed to the units of the testing side loaded with the new piece of software via said redundant interface unit.

4. A method as defined in claim 1, characterised in that the method further comprises the following steps:

a software for generating test connections is arranged in a unit of the network element, and the test connections are generated using said software for generating.

5. A method as defined in claim 1, characterised in that the method further comprises the following steps:

a second network element is connected to the network element;

a software for generating test connections is arranged in said second network element, and the test connections are generated using said software for generating.

6. A method as defined in claim 1, characterised in that the method further comprises the following steps:

a test equipment is arranged in conjunction with a unit of the network element, and the test connections are generated using said test equipment.

7. A method for updating software in a network element of a telecommunication network which network element comprises units and which method comprises the following steps:

the units are logically divided into an original side and testing side, in the units of the original side, the original software is maintained, traffic transmitting tasks of the network element are performed using the units of the original side, one or more units of the testing side are loaded with a new piece of software, the new piece of software is introduced, it is found out whether the units loaded with the new piece of software are operating in a desired way, in case not, the update is rejected, and in case they do, the update is accepted, characterised in that the method further comprises the following step:

in the introduction phase of the new piece of software, a connection data is generated which connection data comprises predetermined information of the existing connections of the network element, in the introduction phase of the new piece of software, said connection data is arranged to be used by the units of the testing side, and in the introduction phase of the new piece of software, said new piece of software is activated utilising said connection data and maintaining the existing connections of the network element.

8. A method as defined in claim 7, characterised in that the method further comprises the following steps:

in the activation process of the new piece of software, said new piece of software utilising the connection data is downloaded from the testing side into one or more units of the original side, and in the activation process, the traffic transmitting tasks of the network element are performed using the units of the original side loaded with the new piece of software utilising the connection data.

9. A method as defined in claim 7, characterised in that the method further comprises the following steps:

in the activation process, the traffic transmitting tasks of the network element are performed using the units of the testing side loaded with the new piece of software utilising the connection data.

10. A method as defined in claim 8, characterised in that the method further comprises the following step:

when downloading the new piece of software from the testing side into the units of the original side message communication links are used.

11. A method for updating software in a network element of a telecommunication network which network element comprises units and which method comprises the following steps:

the units are logically divided into an original side and testing side, in the units of the original side, the original software is maintained, current traffic transmitting tasks of the network element are performed using the units of the original side, one or more units of the testing side are loaded with a new piece of software, the new piece of software is introduced, it is found out whether the units loaded with the new piece of software are operating in a desired way, in case not, the update is rejected, and in case they do, the update is accepted, characterised in that the method further comprises the following steps:

in the introduction phase of the new piece of software, units are logically divided from the original side into the testing side one at a time as their respective current traffic transmitting tasks are finished, and in the introduction phase of the new piece of software, forthcoming traffic transmitting tasks of the network element are performed using said units logically divided from the original side into the testing side.

12. A method as defined in claim 11, characterised in that the method further comprises the following step:

the network element is implemented using a packet-switched technique such as, e.g. an ATM technique.

13. A method as defined in claim 12, characterised in that the network element is a digital telephone exchange.

14. A system for updating software in a network element of a telecommunication network which system comprises:

a network element, which comprises units that are logically divided into an original side and testing side, an original software for performing traffic transmitting tasks which original software has been loaded into one or more units of the original side, and a new piece of software to test which new piece of software has been loaded into one or more units of the testing side, characterized in that the system further comprises:

one or more test connections directed into the units of the testing side loaded with the new piece of software, in order to be able to test the new piece of software in question.

15. A system as defined in claim 14, characterised in that the system further comprises:

an active interface unit, active multiplexing unit and active switching field unit, which are logically divided into the original side, a redundant multiplexing unit and redundant switching field unit, which are logically divided into the testing side, a generator for generating test connections, and one or more test connections that are directed into the units of the testing side loaded with the new piece of software via the aforementioned active interface unit and redundant multiplexing unit.

16. A system as defined in claim 14, characterised in that the system further comprises:

an active interface unit, active multiplexing unit and active switching field unit that are divided into the original side, a redundant interface unit, redundant multiplexing unit and redundant switching field unit that are divided into the testing side, a generator for the generation of the test connections, and one or more test connections that are directed to the units of the testing side loaded with the new piece of software via the aforementioned redundant interface unit.

17. A system as defined in claim 14, characterised in that the system further comprises:

a generator which comprises a test equipment for the generation of test connections and which software for generation is arranged in some unit of the network element.

18. A system as defined in claim 14, characterised in that the system further comprises:

a second network element (140) which is connected via the telecommunication network (150) to the network element to update (130), and a generator (143) which comprises the software for generating (143) for the generation of tests connections and which software for generating (143) has been arranged in the second network element (140).

19. A system as defined in claim 14, characterized in that the system further comprises:

a generator which comprises test equipment for the generation of test connections, which test equipment has been arranged in conjunction with some unit of the network element.

20. A system for updating software in a network element of a telecommunication network, comprising:

a network element, comprising units that are logically divided into an original side and testing side, an original software for performing traffic transmitting tasks of a network element which original software has been loaded into one or more units of the original side, and a new piece of software to be introduced which new piece of software has been loaded into one or more units of the testing side, characterised in that system further comprises:

a connection data which comprises predetermined information of the existing connections of the network element in question and which connection data is arranged to be used by the units of the testing side, and a new piece of software for performing traffic transmitting tasks of the network element in question utilising the connection data and maintaining the existing connections of the network element in question.

21. A system as defined in claim 20, characterised in that the system further comprises:

a new piece of software for performing traffic transmitting tasks of the network element in question utilising the connection data and maintaining the existing connections of the network element in question, which new piece of software has been loaded from the testing side into one ore more units of the testing side.

22. A system as defined in claim 20, characterised in that the system further comprises:

a new piece of software for performing traffic transmitting tasks of the network element in question utilising the connection data and maintaining the existing connections of the network element in question, which new piece of software has been loaded into one or more units of the testing side.

23. A system as defined in claim 21, characterised in that the system further comprises:

message communication links for loading the new piece of software from the testing side into one or more units of the original side.

24. A system as defined in claim any one of claims 23, characterised in that the system further comprises:

a network element which is implemented using a packet-switched technique, such as, e.g. the ATM technique.

25. A system as defined in claim 24, characterised in that the system further comprises:

a network element which comprises an active interface unit which is connected to the multiplexing units via the UTOPIA Level 2 interface.

26. A system as defined in claim 25, characterised in that the system further comprises:

a network element which comprises a multiplexing unit that has at least one vacant UTOPIA address available for testing.

27. A system as defined in claim 26, characterised in that the system further comprises:

a network element which is a digital telephone exchange.

* * * * *